United States Patent [19]

Quitschau et al.

[11] Patent Number: 5,341,566
[45] Date of Patent: Aug. 30, 1994

[54] CONDUIT ATTACHMENT

[75] Inventors: Algird R. Quitschau, Downers Grove; Dennis K. Seals, Carol Stream, both of Ill.

[73] Assignee: Eaton Corporation, Cleveland, Ohio

[21] Appl. No.: 59,794

[22] Filed: May 10, 1993

[51] Int. Cl.$^5$ .............................. B23P 15/00
[52] U.S. Cl. .................... 29/890.035; 29/890.13; 29/890.14
[58] Field of Search ......... 29/890.13, 890.14, 890.144, 29/890.043, 890.035, 428

[56] References Cited

U.S. PATENT DOCUMENTS

| | | | |
|---|---|---|---|
| 560,919 | 5/1896 | O'Toole | 29/890.043 |
| 2,120,067 | 6/1938 | Gray et al. | 29/890.14 |
| 2,417,350 | 3/1947 | Conroy | 29/890.14 |
| 3,064,707 | 11/1962 | Walts | 29/890.043 |
| 3,785,029 | 1/1974 | McClellan et al. | 29/890.13 |
| 4,651,821 | 3/1987 | Moranne | 29/890.043 |
| 4,712,809 | 12/1987 | Legris | 29/890.14 |
| 5,022,151 | 6/1991 | Sorenson | 29/890.144 |
| 5,101,561 | 4/1992 | Fuhrmann et al. | 29/890.043 |
| 5,131,145 | 7/1992 | Badoureaux | 29/890.144 |
| 5,226,235 | 7/1993 | Lesage | 29/890.043 |

Primary Examiner—Irene Cuda
Attorney, Agent, or Firm—Roger A. Johnston

[57] ABSTRACT

A method of attaching and sealing a straight walled tubular fitting to a block or valve body. The end of the tubing is closely fitted in a counterbore which has an undercut groove with a recessed elastomeric seal ring with the inner edges of the groove chamfered. A tubular insert having a thickened wall portion at one end is received in the tube so the thickened wall is coincident with the seal ring. A tapered punch is driven in the thickened end of the insert, causing the tubing wall to bulge locally and expand into the chamfered groove to secure the tube in the block and seal against the seal ring.

3 Claims, 1 Drawing Sheet

CONDUIT ATTACHMENT

BACKGROUND OF THE INVENTION

The present invention relates to techniques for attaching rigid conduits onto a solid block as, for example, the body of a valve. In particular, the invention relates to techniques for attaching refrigerant tubing to the block of a thermal expansion valve employed for controlling refrigerant flow in a closed system.

Heretofore, refrigerant tubes have been attached to the body or block of the thermal expansion valve, particularly in automotive air conditioning applications, by means of providing a flanged fitting on the end of the tube and valve block with the aid of a clamp bar and face sealing O-rings.

However, this form of attachment has proven to be troublesome, and due to strain on the tubes, subject to leakage. This is particularly the situation where the tubes are lengthy and subjected to vibration as in automotive air conditioning applications when the severe vibration in service causes the fastening means employed to secure the clamp plate on the tube flange to loosen and permits the connection to leak refrigerant.

Thus it has been desired to find a way or means of attaching rigid refrigerant conduit fittings to a solid block, such as the body of a thermal expansion valve in a manner which is low in cost to facilitate mass production, such as encountered in automotive air conditioning applications, and yet provide a reliable seal having a long service life.

Referring to FIG. 4, a known technique for installing a tube fitting on a thermal expansion valve is shown where a conduit 1 has a convolution or annular bulge in the tube formed thereon. The conduit in the known technique of FIG. 4 is inserted in a counterbore with an O-ring 4 provided therein which seals around the outer surface of the conduit. A circular flanged portion 3 formed on the valve block is then deformed with a tool over the convolution on the tube and retains the tube in position in the block.

SUMMARY OF THE INVENTION

The present invention employs a straight metal tube fitting received in an undercut counterbore formed in a solid block or valve body, with the undercut groove having an elastomeric seal ring disposed therein. The straight tube fitting has an insert provided therein which has a thickened annular end portion which coincides with the axial station of the seal ring when the tube is inserted in the counterbore. A tapered punch is inserted in the fitting and moved axially therein to expand the thickened end portion of the insert. Upon radial expansion of the thickened portion of the insert radially outwardly against the wall of the straight tubing, the tubing is caused to bulge into the seal ring groove and retain the tube in the valve block and seal between the outer periphery of the tube and the wall of the counterbore.

The present invention thus provides a unique and novel technique for permanently installing a straight tube fitting in a solid block or valve body. The invention employs an insert with a locally thickened wall which expands against the tube to bulge the tube in an undercut groove in the block and simultaneously seal the tube against an O-ring provided in the groove.

DETAILED DESCRIPTION

Figure 1:
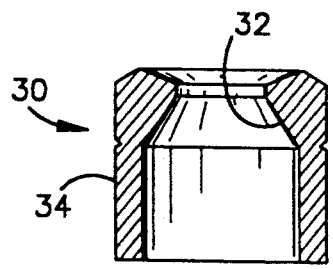
FIG. 1 is a cross-section of an insert for tubing to be installed in accordance with the invention.
Figure 2:
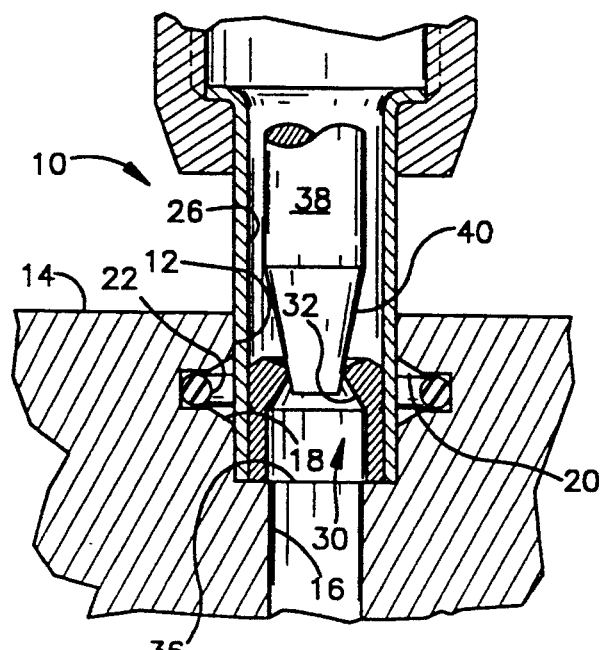
FIG. 2 is a cross-section of the tubing to be installed with the insert therein.
Figure 4:
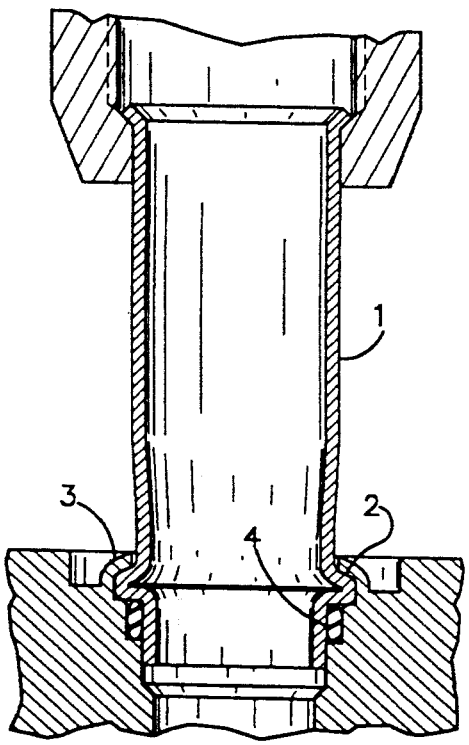

Referring to FIGS. 1 and 2, a relatively short length of straight tubing having a flared end with retaining nut thereon is indicated generally at 10. The unflared end of the tubing is received in a counterbore 12 formed in a block to which the tubing is to be attached as, for example, the body of a thermal expansion valve indicated generally at 14. The valve body 14 has a flow port 16, which communicates directly with counterbore 12. Counterbore 12 has an undercut groove formed therein in the cylindrical wall of the counterbore, with the groove having chamfered sides with denoted by the reference numeral 18, with the generally rectangular deeper center section denoted by reference numeral 20.

An elastomeric seal ring 22 is received in the groove 20, and is sized such that the outer-diameter of the O-ring registers against the radially outer periphery of the groove 20. The O-ring cross-section is chosen such that the inner diameter of the O-ring is greater than the diameter of counterbore 12 by a predetermined amount. As illustrated in FIG. 2, the inner diameter of the O-ring is greater than the outer diameter of the tubing 10 such that a predetermined radial clearance is provided thereabout.

An insert indicated generally at 30 has a generally cylindrical tubular configuration with the wall thereof thickened at one end on the inner periphery, as denoted by reference numeral 32 in FIG. 1 so as to provide a tapered wall on the inner periphery of the tubing at its upper end. The outer diameter 34 of the insert 30 is sized to closely interfit the inner diameter 26 of the tubing 10 in sliding engagement.

With reference to FIG. 2, the insert 30 is inserted into the inner diameter of tube 26 through the upper open end thereof and the insert is registered against the flat bottom of the counterbore 12 on the same surface denoted by reference numeral 36 against which the tubing 10 is registered. With the insert 30 registered against the bottom 36 of counterbore 12, the thickened wall portion coincides with the axial station of the seal ring 22.

A punch 38 having a tapered end 40 is inserted into the thickened end of the insert, and is driven downward by applying a force thereto in the direction of the black arrow in FIG. 2.

Figure 3:
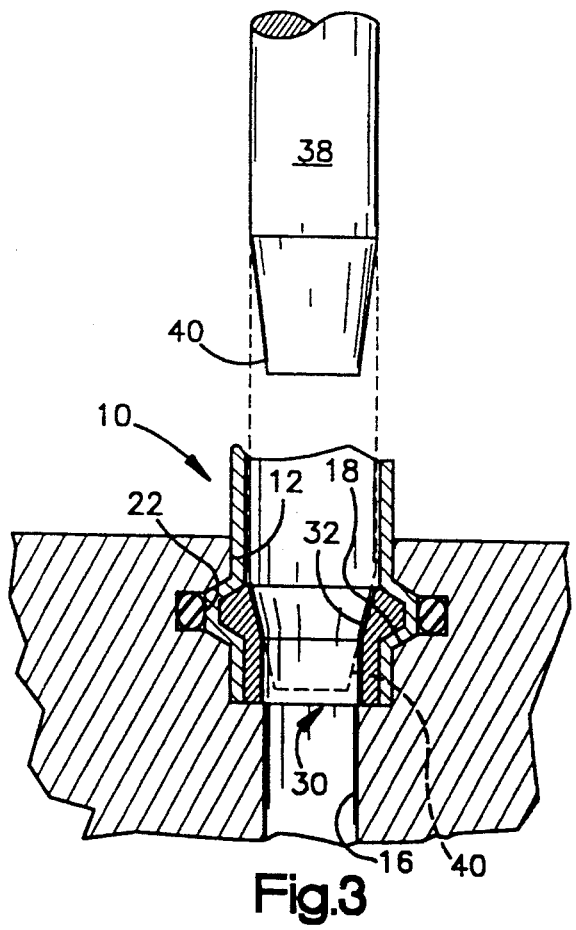
FIG. 3 is a cross-sectional view of the tubing completely installed, with the punch removed; and, FIG. 4 is a cross-sectional view of a prior art tubing installation.

Referring to FIG. 3, the punch is driven downward to the position indicated in dashed outline in which position the tapered surface 40 expands the thickened end of the insert 30 radially outwardly, causing the wall of tubing 10 to bulge outwardly locally into the chamfered area 18 of the groove 20. Bulging of the tubing in the groove in the block retains the tubing securely and seals the outer periphery thereof against the inner diameter of the seal ring 22.

The present invention thus provides a technique for simultaneously swaging a straight tube fitting into a solid block or valve body and sealing the outer periphery of the tube against a seal provided in the block. The method of installing the tubing of the present invention thus provides for secure attachment of the tubing to the block or valve body, and provides for strain relief on the tubing to prevent movement of the seal and leakage.

Although the invention has hereinabove been described with respect to the embodiments illustrated in the drawings, it will be understood that the invention is capable of modification and variation, and is limited only by the spirit and scope of the following claims.

I claim:

1. A method of attaching and sealing a relatively thin walled fluid conduit to a ported block or valve body comprising:

(a) forming a bore in the block or valve body communicating with a port and forming an undercut groove in the bore and disposing a resilient seal ring therein;
   (b) inserting the end of said conduit in said bore and said seal ring;
   (c) disposing a tubular insert with a thickened wall portion of the insert against the wall of said conduit portion in said bore; and,
   (d) inserting a tool and expanding the thickened wall and bulging the wall of said conduit into said groove and sealing said conduit against said seal ring.

2. The method defined in claim 1, wherein the step of inserting a tool includes inserting a tapered punch.

3. The method defined in claim 1, wherein said step of forming an undercut groove includes chamfering the inner edges of said groove.

* * * * *